Sept. 12, 1939.  R. F. CRAWFORD  2,172,363
COMBINED HARVESTER AND THRESHER
Filed Jan. 8, 1937  4 Sheets-Sheet 1
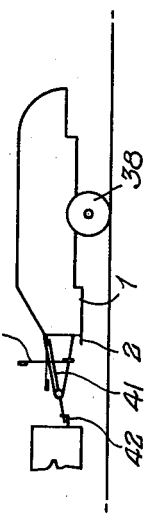
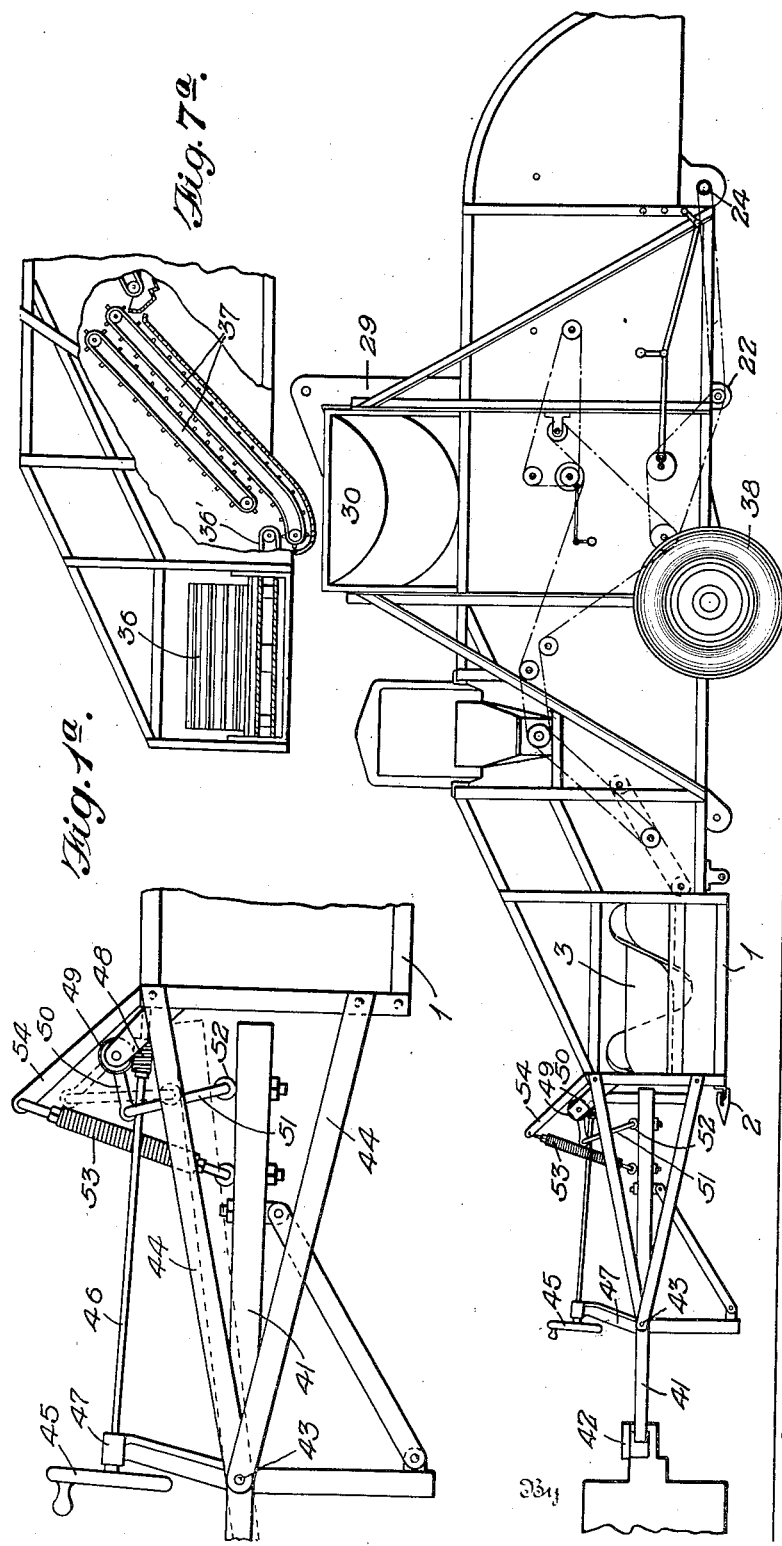
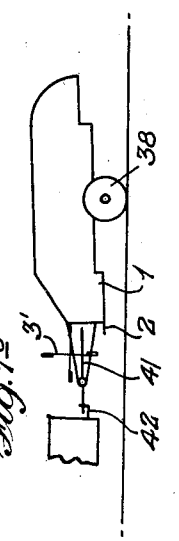
Inventor
RALPH F. CRAWFORD,
by
E.W. Anderson
Attorney Sept. 12, 1939.   R. F. CRAWFORD   2,172,363
COMBINED HARVESTER AND THRESHER
Filed Jan. 8, 1937   4 Sheets-Sheet 2
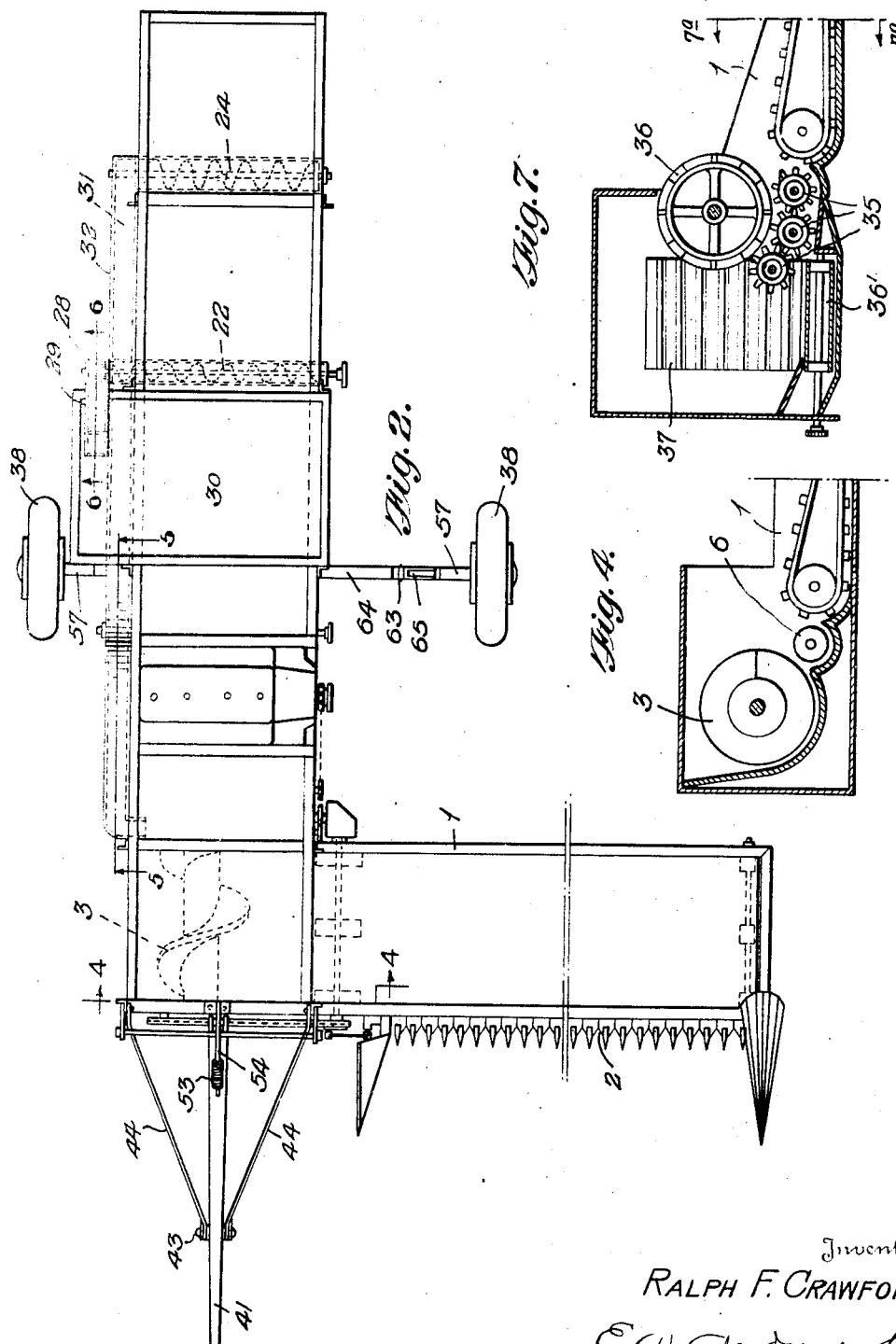
Inventor
RALPH F. CRAWFORD,
By
Attorney

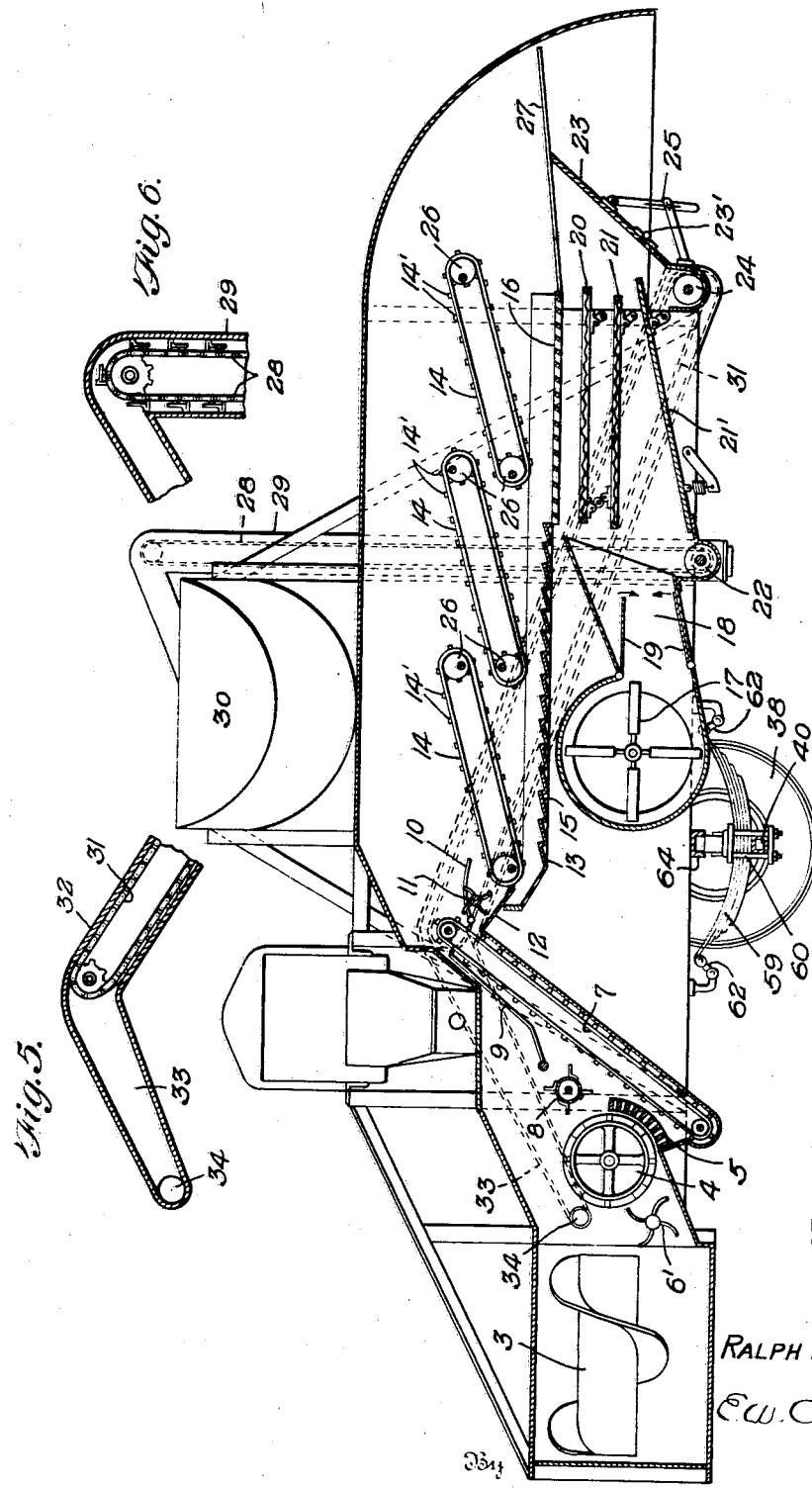

Sept. 12, 1939.  R. F. CRAWFORD  2,172,363
COMBINED HARVESTER AND THRESHER
Filed Jan. 8, 1937  4 Sheets-Sheet 4
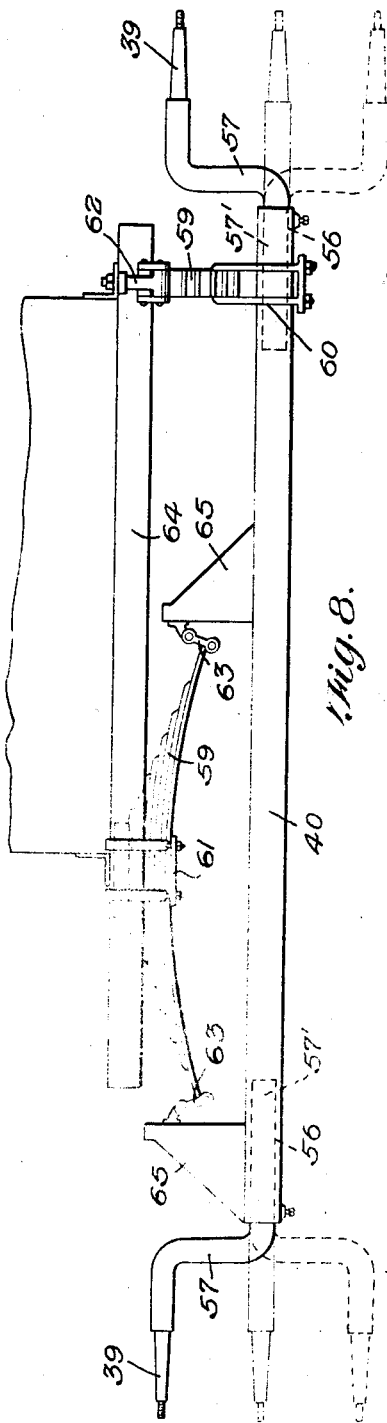
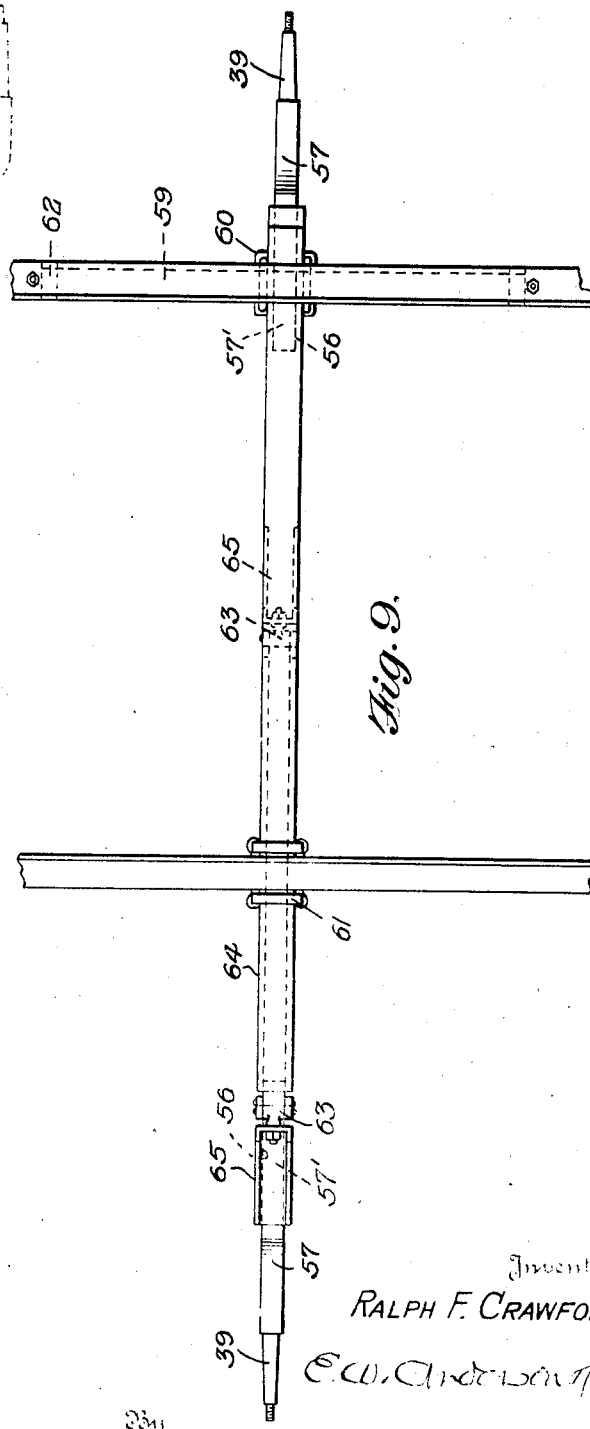
Inventor
RALPH F. CRAWFORD, Patented Sept. 12, 1939

2,172,363

UNITED STATES PATENT OFFICE 2,172,363

COMBINED HARVESTER AND THRESHER

Ralph F. Crawford, Davenport, Iowa

Application January 8, 1937, Serial No. 119,668

9 Claims. (Cl. 56—123)

The invention has relation to combined harvesters and threshers known as "combines" having for an object to provide an improved small combine such as the average farmer can afford to purchase, and which is adapted to be constructed largely from certain standard automobile or truck parts, such as can be readily obtained in the open market for a comparatively small price for building and repair purposes. Another object is to support the combine including its platform carrying the cutting mechanism and reel upon two wheels of a single axle, with efficient means of spring support thereof upon such axle, such as will tend to eliminate sidesway on the platform side. Another object is to provide means for raising and lowering the level of the platform, cutting mechanism and reel for cutting grain or other crops of different heights by raising the level of the combine body, its platform, cutting mechanism and reel as a whole. Another object is to accomplish the raising of such level by two adjustments, one of which is the vertical adjustment of the axle spindles and the wheels thereon relative to the axle proper, and the other of which is the vertical adjustment of the combine body, platform, cutting mechanism and reel upon said axle and relative to a tractor connection. Other objects and advantages will appear hereinafter.

The invention consists in the novel construction and combination of parts as hereinafter set forth in the claims.

In the accompanying drawings:

Figure 1 is a side view of the combine taken from the platform side, and partly broken away, the drive being shown in dotted lines.

Figure 1a is a side view on a larger scale in detail of the hand operated means for vertically adjusting the combine upon its axle relative to the tractor connection, parts being broken away, and an adjusted position of the draw bar being shown in dotted lines.

Figure 1b is a diagrammatic side view of the combine and its forward tractor connection, showing the adjustment obtained from the position shown in Figure 1 by vertically adjusting the spindles and the wheels thereon relative to the axle and the body of the combine.

Figure 1c is a similar view, showing the adjustment obtained from the position shown in Figure 1b by vertically adjusting the combine upon its axle relative to the tractor connection, thereby completing the adjustment to a higher level. A similar adjustment may be made for a lower level.

Figure 2 is a plan view of the combine, with parts in dotted lines.

Figure 3 is a central longitudinal section of the combine, the motor and the grain bin being not in section, and the hounds and the draw bar being omitted, parts being shown in dotted lines.

Figure 4 is a section on the line 4—4, Figure 2.

Figure 5 is a detail fragmentary section on the line 5—5, Figure 2.

Figure 6 is a detail fragmentary section on the line 6—6, Figure 2.

Figure 7 is a view similar to Figure 4, showing another form of cylinder and concave, wherein the concave is made of intergeared toothed rollers, and showing another form of delivery means from the cylinder and concave to the straw racks.

Figure 7a is a section on the line 7a—7a, Figure 7.

Figure 8 is a detail side view of the axle, its spring connections with the body of the combine, and its vertically adjustable spindles, the latter being shown in positions of greatest adjustment upwardly in full lines and downwardly in dotted lines.

Figure 9 is a plan view of the same, the body of the combine being omitted.

In these drawings, the numeral 1 designates the platform, carrying the usual cutting mechanism 2, and a reel 3', said platform delivering to a longitudinal auger 3, the latter delivering to the cylinder and concave 4 and 5, a rotary feeder 6 being interposed between said platform and said auger, and a rotary feeder 6', being interposed between said auger and the cylinder and concave. The grain is discharged from the concave 5 upon an inclined endless belt elevator 7, the straw being carried upwardly between a beater 8 and said elevator, and pressed down by the weight of loose spaced pivoted fingers 9, the straw and grain being delivered by said elevator to stationary spaced fingers 10 between which work the radial curved arms of a rotary picker 11, to thereby comb, loosen and spread the straw, said picker being driven at a speed adapted to throw the straw upwardly and rearwardly and to agitate or shake up the straw so that grain and chaff will fall through the aforesaid spaced fingers 10 upon an inclined grain board 12, the latter delivering to a vibratory grain pan 13, and the straw being delivered to the foremost of the vibratory straw racks 14.

The grain pan is provided with a forward solid stepped bottom portion 15, adapted to throw the grain rearwardly, and a rear open slatted bottom portion 16, through which the grain will pass.

Below the solid stepped bottom portion of the grain pan are located the fan and fan chute 17, 18, of the grain cleaner, said chute having upper and lower adjustable blast boards 19, adapted to alter the direction of and to concentrate or spread the blast.

Below the open slatted bottom portion of the grain pan are located the vibratory screens 20, 21 of said cleaner, grain passing through said screens being discharged upon an inclined grain board 21', delivering at its lower end to a transverse auger 22. The tailings are discharged from the rear ends of said screens against an adjustable inclined tail board 23, hinged at 23', and which delivers the tailings to a transverse auger 24. The tail board 23 is adjustable upon its said hinge to vary its inclination by suitable means, such as an adjustable bolt and slot supporting device 25.

The straw racks, of which there are the usual series, comprise sprocket chains 14, the sprocket gears 26 of which are eccentrically mounted upon their shafts so that a vibratory up and down oscillating movement is given the straw to shake out the grain, said straw at the same time being carried rearwardly by said racks the spaced chains of which are provided with spaced transverse slats 14', the straw being delivered from the rearmost straw racks to stationary spaced fingers 27, extending rearwardly from the grain pan and forming a grating, the tail board 23 terminating at its upper end approximately midway of said grating, any grain remaining in the straw falling through the forward portion of said grating upon said tail board, whereas the straw will be thrown rearwardly upon the rear portion of said grating wherethrough it will pass and be discharged. The straw will be in comparatively short lengths after passage through the machine, thereby adapting it to pass through said grating. This grating 27 has a slight tilt forwardly, so that any grain remaining in the straw will tend to travel forwardly and fall through the grating upon said tail board.

The straw racks comprise three series as shown, the foremost of which are located above the solid stepped bottom portion of the grain pan, the middle straw racks being located partly over said stepped portion and partly over the open slatted bottom portion of said pan, and the rearmost straw racks being located over said slatted portion of the pan. The solid stepped bottom portion of the grain pan in the vibration thereof throws the grain rearwardly over the fan and the fan chute, and discharges the grain upon the open slatted bottom portion of said pan, wherethrough the grain will fall upon the vibratory screens of the grain cleaner, the chaff being blown rearwardly against the tail board and upwardly through the forward portion of the grating 27 and being discharged with the straw through the rear portion of said grating.

The grain delivered to the transverse auger 22, is discharged upon an upright endless belt elevator 28, working in a housing 29, said elevator discharging into the elevated grain bin 30. The tailings delivered to the transverse auger 24, are discharged upon an endless belt elevator 31, having a housing 32, said elevator and housing being inclined upwardly and forwardly to a point sufficiently above and forward of the cylinder and concave so that a forward and downward extension 33 of said housing will deliver the tailings at 34 to the cylinder and concave to be again passed therethrough.

Another form of concave is shown in Figure 7 of the drawings, wherein it is formed of intermeshed toothed rollers 35, against the teeth of which the cylinder has threshing engagement, said toothed rollers acting also as feeders towards and away from the cylinder, said cylinder and concave delivering to a short horizontal endless belt conveyor 36, which discharges between upper and lower inclined endless belt conveyors 37, delivering to the foremost of the straw racks.

As the dimensions and weight of this combine are comparatively small, it is designed to be supported upon two wheels 38, located on the spindles 39 of a single axle 40, so located that the combine will be well balanced thereon.

In order to raise and lower the level of the platform, cutting mechanism and reel in cutting crops of different heights, it is designed to vertically adjust the combine body, its platform, cutting mechanism and reel as a whole, this being accomplished by two adjustments, one being the vertical adjustment of the axle spindles and the wheels thereon relative to the axle proper, and the other being a pivotal adjustment of the combine body, its platform, cutting mechanism and reel upon said axle and relative to a tractor connection, means for this purpose being described as follows:

A lever draw bar 41 has a forward tractor connection 42, which forms the fulcrum of said lever draw bar, the latter being pivoted intermediately of its length at 43 to the forward end of the hounds 44, and extending rearwardly between said hounds. A hand wheel 45 has its shaft 46 supported in bearings 47 of the framing and is provided with a worm 48, engaged by a worm wheel 49, the shaft of which has bearings in the framing, a crank arm or arms 50 of said worm wheel shaft having pivoted link connection 51 with the rear end portion of said draw bar at 52 to thereby adjust said draw bar pivotally upon said forward tractor fulcrum connection on rotation of the hand wheel. The draw bar is held normally in horizontal position by coiled spring 53, one end of which has connection with a frame support 54 and the other end of which has connection with said draw bar, and adjustment of the draw bar is against the tension of said spring, the worm and worm wheel engagement holding the adjustment.

The transverse axle 40, has longitudinal end seats 56, of squared form in cross section, end crank arms 57 having spindles 39, whereon the supporting wheels 38, are mounted and horizontal inner end portions 57' forming stub shafts, the latter being also of squared form in cross section and fitting removably in said seats, being adjustable therein one quarter around for ninety degree adjustment and one half around for one hundred eighty degrees adjustment, this adjustment being in the one case for the length of the crank arms which is six inches preferably and in the other case for double the length of said crank arms or twelve inches.

This adjustment is obtained by jacking up the combine, removing the stub shafts, from said seats of the axle, along with the crank arms, spindles and supporting wheels, and reinserting the stub shafts in said seats after the desired adjustment is made.

In order to provide efficient means of spring support for the combine body including the platform carrying the cutting mechanism and reel upon the single axle aforesaid adapted to eliminate sidesway which might readily be caused by said cutting platform extending laterally of the machine at one side thereof as customary and raised and lowered along with the combine body proper, a problem is involved, the solution of which is accomplished as follows:

Transverse and longitudinal bowed leaf springs 58 and 59, at right angles to each other have the middle portions thereof clipped at 60 and 61 respectively to the axle and the combine body and the terminal portions thereof provided with pivoted shackle connections 62 and 63 respectively to the combine body and to the axle, said longitudinal bowed leaf spring being longitudinal with respect to said axle and having approximately one half thereof extending beyond the platform side of the combine body where the weight is greatest, the axle extending beyond the combine body at the platform side thereof more than on the other side so that the outer terminal portion of said longitudinal bowed leaf spring may have the said pivoted shackle connection to the axle.

The combine body is provided with a transverse beam 64, located immediately above and aligned with the axle and to which the middle portion of said longitudinal bowed leaf spring is clipped as aforesaid and with which the terminal portions of said transverse bowed leaf spring have pivoted shackle connections as aforesaid. The axle is provided with upwardly extending brackets or supports 65, to which the terminal portions of said longitudinal bowed leaf spring have pivoted shackle connections as aforesaid, the outer of said brackets or supports being located near the spindle end portion of the axle extension at this platform side, the other bracket or support being located nearly opposite the transverse middle portion of the combine body. This beam 64 has extension at the platform side over the outer half of the said longitudinal bowed leaf spring and affords a reinforce against undue flexing of this half of said spring.

I claim:

1. A combine, provided with a platform having cutting mechanism and a reel, a transverse axle having end spindles and wheels thereon for supporting the combine intermediately of its length, means for raising and lowering the level of said platform, cutting mechanism and reel comprising means for adjusting the level of the combine body, platform, cutting mechanism and reel as a whole including means for pivotally adjusting the combine body, its platform, cutting mechanism and reel upon said axle and relative to a tractor connection, and means of spring support for said combine body, platform, cutting mechanism and reel upon said axle adapted to eliminate sidesway upon the platform side comprising bowed leaf springs respectively transverse and longitudinal with respect to said axle and at right angles to each other, the middle portions of said springs having clip connections respectively to the axle and to the combine body and the terminal portions thereof having pivoted shackle connections respectively to the combine body and to said axle.

2. In a combine, provided with a platform having cutting mechanism and a reel, a transverse axle having end spindles and wheels thereon for supporting the combine intermediately of its length, means for raising and lowering the level of said platform, cutting mechanism and reel comprising means for adjusting the level of the combine body, platform, cutting mechanism and reel as a whole including vertically adjustable crank arms connecting said spindles with said axle, and means of spring support for said combine body, platform, cutting mechanism and reel upon said axle adapted to eliminate sidesway upon the platform side and including bowed leaf springs respectively transverse and longitudinal with respect to said axle and at right angles to each other, the middle portions of said springs having clip connections respectively to the axle and to the combine body and the terminal portions thereof having pivoted shackle connections respectively to the combine body and to the axle.

3. In a combine, provided with a platform having cutting mechanism and a reel, a transverse axle having end spindles and wheels thereon for supporting the combine intermediately of its length, means for adjusting the level of said platform, cutting mechanism and reel comprising means for adjusting the level of the combine body, platform, cutting mechanism and reel as a whole including means for pivotally adjusting the combine body, its platform, cutting mechanism and reel upon said axle, and means for adjusting the level of said axle spindles and the wheels thereon relative to said axle, and means of spring support for the combine body, its platform, cutting mechanism and reel upon said axle adapted to eliminate sidesway on the platform side, comprising a bowed leaf spring longitudinal with respect to said axle and the middle portion of which has clip connection with the combine body adjacent the platform side and the terminal portions of which have pivoted shackle connections with the axle, said axle having an extension beyond the platform side, and the outer half of said spring extending beyond the combine body at this side.

4. A combine, provided with a lateral platform extension having cutting mechanism and a reel, a transverse axle, provided with wheels thereon for support of the combine body intermediately of its length, and means of spring support for the combine body, its platform, cutting mechanism and reel adapted to eliminate sidesway on the platform side, comprising bowed leaf springs respectively transverse and longitudinal with respect to said axle and at right angles to each other, the middle portions of which have clip connection respectively to the axle and to the combine body and the terminal portions of which have pivoted shackle connections respectively to the combine body and to said axle.

5. A combine having a lateral platform extension provided with cutting mechanism and a reel, a transverse axle extending beyond the combine body at the platform side more than on the other side and provided with wheels thereon for support of the combine body, its platform, cutting mechanism and reel, and means of spring support for the combine body, its platform, cutting mechanism and reel adapted to eliminate sidesway on the platform side, comprising bowed leaf springs respectively transverse and longitudinal with respect to said axle and at right angles to each other, the middle portions of which have clip connection respectively to the axle and to the combine body and the terminal portions of which have pivoted shackle connections respectively to the combine body and to the axle, said longitudinal bowed leaf spring having approximately one half thereof extending beyond the platform side of the combine body.

6. In a combined harvester and thresher, provided with a lateral platform extension having cutting mechanism and a reel, a transverse axle having wheels thereon for support of the body of the machine intermediately of its length, a draw bar having a forward fulcrum tractor connection, means for raising and lowering the level of said body, its platform, cutting mechanism and reel including means for adjusting said body relative to its wheel supports upon said fulcrum connection as a center, and means for adjusting said draw bar in either direction upon said fulcrum connection to complete the adjustment to higher or lower level, and means of spring support for said body, its platform, cutting mechanism and reel adapted to eliminate sidesway upon the platform side comprising bowed leaf springs respectively transverse and longitudinal with respect to said axle and at right angles to each other, said axle having extension beyond the platform side of said body and said longitudinal spring having also extension beyond said side.

7. In a combined harvester and thresher, provided with a lateral platform extension having cutting mechanism and a reel, a transverse axle having wheels thereon for support of the body of the machine intermediately of its length, a draw bar having a forward fulcrum tractor connection, means for raising and lowering the level of said body, its platform, cutting mechanism and reel including means for adjusting said body relative to its wheel supports upon said fulcrum connection as a center and means for adjusting said draw bar in either direction upon said fulcrum connection, and means of spring support for said body, its platform, cutting mechanism and reel adapted to eliminate sidesway upon the platform side comprising bowed leaf springs respectively transverse and longitudinal with respect to said axle and at right angles to each other, said axle having extension beyond the platform side and said longitudinal spring having also extension beyond said side, said springs being respectively fixedly secured to said axle and to said body and having the ends thereof pivotally connected respectively to said body and said axle.

8. In a combined harvester and thresher wherein there is provided a body, a transverse axle having wheels thereon for pivotal support of said body, and means for adjusting said body vertically relative to its wheel supports; said body having a lever draw bar provided with a work connection therewith and a forward fulcrum tractor connection, and means for adjusting the holding the adjustment of said lever draw having a power connection therewith whereby in said vertical adjustment of said body the latter is tilted upon its wheel supports from the forward fulcrum tractor connection of said draw bar as a center, said means for adjusting said lever draw bar being adapted to correct the tilt of and level said body.

9. In a combined harvester and thresher wherein there is provided a body, a transverse axle having wheels thereon for pivotal support of said body, and means for adjusting said body vertically relative to its wheel supports, said means for adjusting said body vertically being adapted to accomplish the vertical adjustment either upwardly or downwardly; said body having a normally centralized lever draw bar provided with a work connection therewith and a forward fulcrum tractor connection, and means for adjusting and holding the adjustment of said lever draw bar in either of two directions having a power connection therewith whereby in said vertical adjustment of said body either upwardly or downwardly the latter is tilted upon its wheel supports from the forward fulcrum tractor connection of said draw bar as a center, said means for adjusting said lever draw bar being adapted to correct the tilt of and level said body at the higher or lower elevation.

RALPH F. CRAWFORD.